April 14, 1931.   W. SCHEPPMANN   1,800,962
ELECTRIC CIRCUIT
Filed Sept. 17, 1929
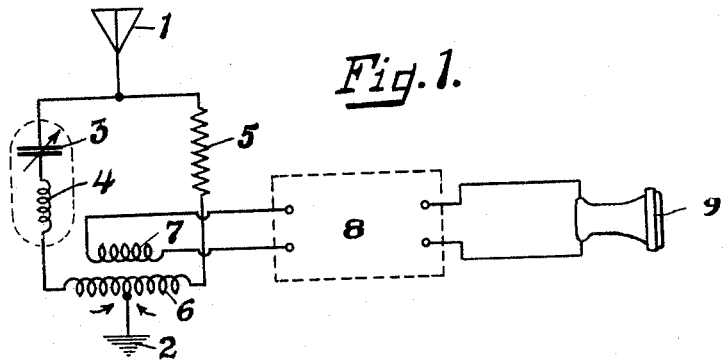
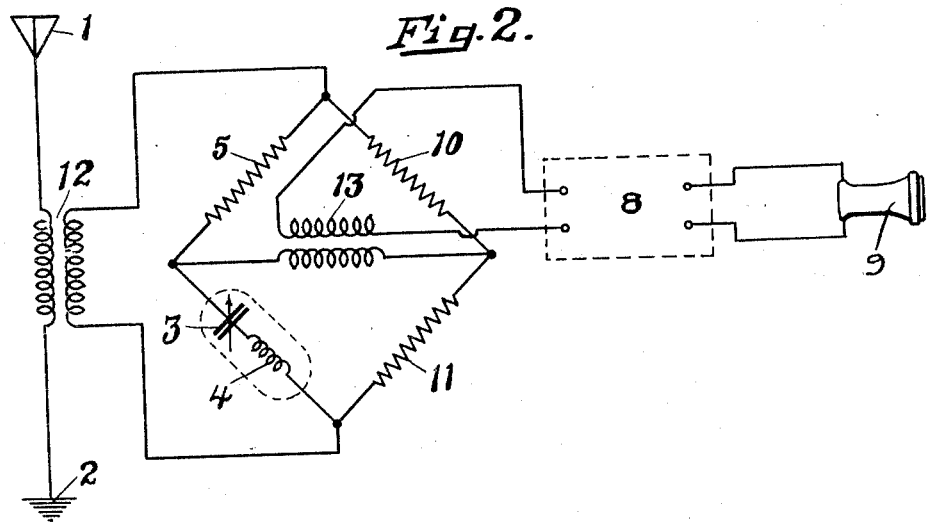
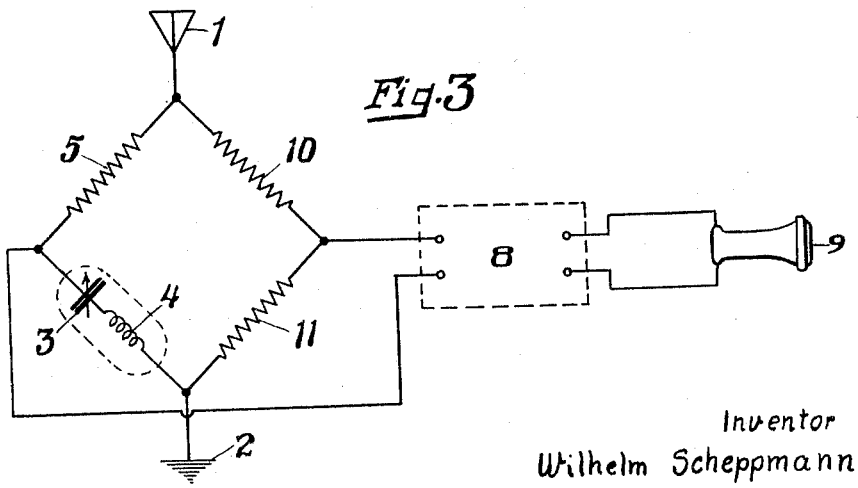
Inventor
Wilhelm Scheppmann
By
Samuel Ostrolenk
Attorney Patented Apr. 14, 1931

1,800,962

UNITED STATES PATENT OFFICE

WILHELM SCHEPPMANN, OF BERLIN-TEMPELHOF, GERMANY, ASSIGNOR TO C. LORENZ AKTIENGESELLSCHAFT, OF BERLIN-TEMPELHOF, GERMANY

ELECTRIC CIRCUIT

Application filed September 17, 1929, Serial No. 393,229, and in Germany September 24, 1928.

This invention refers to electrical alternating current circuits and is particularly directed to circuits used in radio transmission and reception.

One object of the invention consists in providing means for suppressing or rendering unobjectionable currents of an undesired frequency.

A specific object of my invention is to provide a circuit arrangement for a radio system for balancing a current of undesired frequency and preventing such current from entering into an operative circuit.

A further object of the invention consists in designing a neutralizing or balancing circuit arrangement, in which the adjustment of the balancing currents may be carried out independently of phase conditions.

A further object of my invention is to provide means in connection with a balancing or neutralizing circuit in which the balancing and tuning conditions may be adjusted in an easy and most efficient manner in the same way as is the case in an ordinary radio circuit.

These and further objects of my invention will become more apparent by the following detailed description, taken in conjunction with the appended drawings, which show some forms in which my invention may be embodied. I wish it to be understood, however, that this description is illustrative only of the principle of the invention and should not have the effect of allowing a narrow interpretation of the invention, short of its broad and most comprehensive scope, as set forth in the appended claims.

In the drawings, Figure 1 illustrates a balancing system which has been proposed previously and over which my invention constitutes an improvement.

Figure 2 illustrates one form of balancing circuit embodying the principle of my invention and Figure 3 is a similar circuit to Figure 2, constituting a modification of same.

In the art of radio transmission and reception, substantially two methods have become known for suppressing or for rendering unobjectionable a current of undesired frequency. The first of these methods, in its broad principle, consists of providing a by pass for such objectionable current and thus preventing it from entering into an operative circuit, such as a translating circuit, including a telephone or other receiver. Circuits of this nature are known under the terms of wave traps, filter circuits and the like.

Another, basically different, method consists in producing a balancing or neutralizing current of opposite phase and equal intensity. By providing means whereby the production of such balancing current of the operating frequency is prevented, it is obtained that only undesired frequencies are balanced in the operative or output circuit, whereas currents of the operating frequencies will exist in their full intensity. It is such balancing or neutralizing circuit that the present invention is especially concerned with.

Principally, such an arrangement consists in two circuit paths into which an incoming current is diverted and which circuit paths are coupled with a common output circuit in such a manner that the component currents oppose each other. As is well known, in order to obtain complete suppression of two alternating currents, it is necessary that they are of equal amplitude and that they are displaced by 180 degrees in respect to each other.

In balancing circuits using direct current, only one of these requirements is necessary; that is, the currents need have only equal intensity of opposite polarity, in order to effect complete cancellation. The above requirement concerning phase conditions has made it impracticable and imposible to use such balancing or neutralizing systems in radio transmitting and receiving installations for balancing purposes, as is well known to one skilled in the art.

In my co-pending application, Serial No. 164,020, I have shown a balancing circuit which is independent of any phase adjustment and which, therefore, is as easily adjustable as a direct current neutralizing apparatus, affording only the adjustment of equal amplitude of the balancing currents. This circuit is illustrated in Figure 1 of the drawings for the purpose of reference and for a better understanding of my new improvements, in accordance with my present invention.

Referring to Figure 1, an antenna earth receiving system 1, 2 is represented, such as is used for receiving radio waves. The currents established in the antenna circuit are diverted into two compensating paths. One of these paths contains an inductance 4 and a variable capacity 3, in series and one half of the primary 6 of a neutralizing transformer, whose mid-point is tapped and connected to the ground 2. The second circuit path, besides the second half of the neutralizing transformer primary, includes a balancing resistance 5. The sense of winding of the balancing transformer primary 6 and secondary 7 is such that the currents flowing in the two halves of the primary and illustrated by arrows in said figure will substantially balance each other in the secondary. The secondary is, furthermore, connected to a radio receiver which is schematically indicated at 8 and which may be of any well-known type, such as a neutrodyne receiver or a super-heterodyne, or the like. The receiver output is shown to operate a telephone or loud speaking device 9. By tuning the capacity 3 and inductance 4, which, in the art, are referred to as an acceptor circuit to the frequency of an interfering wave, it is obtained that the balancing action is effective for this single wave only, whereas all the other waves of different frequency; that is, primarily those of the operating or reception frequency, will produce substantially unequal balancing currents and will thus be translated to the receiver in almost their full strength. As is well known, an acceptor circuit consisting of an inductance and the capacity in series, such as 3, 4 in the circuit according to Figure 1, presents an impedance to a wave of the frequency to which it is tuned, which is equivalent to a pure ohmic resistance presented by the loss resistance of the inductance and the capacity. This resultant ohmic resistance presented by the acceptor circuit 3, 4 to the interfering wave to which it is tuned, is completely balanced by the resistance 5 in the other compensating path, so that in the secondary 7 of the neutralizing transformer a balancing of this special wave is obtained. For all the remaining waves of different frequency, the acceptor 3, 4 presents a comparatively much higher impedance and thus the balancing condition for such waves is completely upset and they will, accordingly, be transferred to the secondary 7 and, accordingly, the receiver 8.

It is seen that such a system is particularly useful for cases in which one interfering wave is impinging upon the receiving antenna. This is especially the case where a transmitting and receiving station are arranged in close proximity to each other, such as in wireless transmitting equipment on board ships, and where it is required to simultaneously transmit and receive signals. By tuning, in this case, the acceptor 3, 4 of the frequency of transmitter, its influence upon the receiver may be completely eliminated, even with comparatively high transmission power and with transmitting and receiving frequency being fairly close to each other.

The advantage of this specific circuit, according to Figure 1, consists in that the interfering wave may be very close to the operating wave or the reception frequency and will be completely balanced in the receiver. With the older means, such as wave traps, etc., there is soon reached a limit when the difference of frequency between a useful wave and an interfering wave is so small or when the interfering signal is so strong that an effective balancing action becomes practically impossible.

A circuit, as disclosed by Figure 1, however, has some further drawbacks, which consist primarily in the use of a neutralizing or balancing transformer 6, 7. The construction of such a transformer, which is equally effective for all the frequencies to be received, is extremely difficult and expensive, as may become obvious. Even with the most accurate design and arrangement of the compensating coils, it is impossible to avoid small mutual capacity differences within the coils, whereby the compensation for specific frequencies will be disturbed. With the slightest asymetry of the coils, such circuit will become inaccurate and this is particularly the case when the frequency of the interfering wave is fairly close to the frequency of the operating waves.

In accordance with my invention, these drawbacks are overcome and the use of a neutralizing transformer is entirely dispensed with by modifying the previous compensating circuit, in accordance with Figure 1, to assume the form of a Wheatstone bridge arrangement, such as is shown by Figures 2 and 3.

Referring to Figure 2, in which similar reference numbers refer to similar elements to those of Figure 1, a complete Wheatstone bridge is formed by the acceptor 3, 4, its balancing resistance 5 and two further balancing resistance arms 10 and 11. One pair of diagonal terminals of this bridge are connected to the input circuit; that is, the antenna circuit 1, 2, such as by means of a coupling transformer 12. The remaining diagonal branch of the bridge is associated with the receiver 8, such as, for instance, by means of the coupling transformer 13. By such an arrangement the advantages of a circuit, according to Figure 1, are retained; that is, primarily, the independence of any phase condition when tuning and adjusting a circuit, as only ohmic resistances substantially independent of phase are used to form the bridge arms, the acceptor 3, 4 being equivalent as in Figure 1 to a pure ohmic resistance in respect to the wave to which it is tuned. Furthermore, the new advantage is gained in that no balancing or neutralizing transformer is necessary, with its consequent drawbacks.

Figure 3 shows a similar circuit to Figure 2, in which the input or antenna circuit, on the one hand, and the output or receiver input circuit, on the other hand, are directly or conductively coupled to the respective diagonal terminals of the interference eliminating bridge arrangement.

Although the invention has been illustrated by means of specific examples of a radio receiving system, it is obvious that the new circuit may be applied to many other systems, such as to a transmitting system for the suppression of an undesired wave as a disturbing higher harmonic, or for the purpose of suppressing the carrier wave, as in the case of carrier suppression radio telephony.

Furthermore, the new circuit may be used in a signalling system over wire lines, known, for instance, as wired wireless, or also in ordinary telephony, or any other case where it is desired to prevent an undesirable frequency from affecting an operating circuit or device.

What I claim to be secured by Letters Patent in the United States is:—

1. In an electrical circuit arrangement for eliminating a current of interfering frequency, comprising input and output circuits, an acceptor circuit, tuned to said interfering frequency, a resistor to balance the residual resistance of said acceptor circuit, two further ohmic resistances to form a Wheatstone bridge circuit, together with said acceptor circuit and said resistor, said input and said output circuits being associated each with a diagonal branch of said bridge circuit.

2. In an electrical circuit arrangement for eliminating a current of interfering frequency, comprising input and output circuits, an acceptor circuit, comprising an inductance and variable capacity in series, tuned to said interfering frequency, a resistor to balance the residual resistance of said acceptor, two further ohmic resistances to form a Wheatstone bridge circuit, together with said acceptor circuit and said resistor, said input and said output circuits being associated each with a diagonal branch of said bridge circuit.

3. In a bridge circuit arrangement for eliminating a wave of interfering frequency, having one arm consisting of an acceptor circuit, tuned to said interfering wave, ohmic resistors to complete said bridge and input and output circuits associated each with one of the diagonal branches of said bridge.

4. In a bridge circuit arrangement for eliminating a wave of interfering frequency, having one arm consisting of an acceptor circuit, including an inductance and a variable capacity, in series, tuned to said interfering wave, ohmic resistors to complete said bridge and input and output circuits associated each with one of the diagonal branches of said bridge.

5. In a radio receiving system, comprising a wave collecting device, a wave receiving and translating device, a bridge circuit arrangement for eliminating waves of interfering frequency, comprising an acceptor circuit, tuned to said interfering frequency and constituting one arm of said bridge and ohmic resistors to complete said bridge and means to electrically associate said wave collecting device and said wave receiving device, each with one of the diagonal branches of said bridge.

6. In a radio receiving system, comprising an antenna circuit, a wave receiving and translating device, a bridge circuit arrangement for eliminating a wave of interfering frequency, comprising an acceptor circuit, including an inductance and a variable capacity, in series, tuned to said interfering frequency, said acceptor circuit forming one arm of said bridge, an ohmic resistance equal to the residual loss resistance of said acceptor circuit and constituting the balancing arm of said acceptor circuit, two further ohmic balancing resistances for completing said bridge and circuit means to associate said antenna circuit and said receiving and translating device, each with one of the diagonal branches of said bridge.

7. In a radio receiving system, comprising an antenna circuit, a wave receiving and translating device, a bridge circuit arrangement for eliminating a wave of interfering frequency, comprising an acceptor circuit, including an inductance and a variable capacity, in series, tuned to said interfering frequency, said acceptor circuit forming one arm of said bridge, an ohmic resistance equal to the residual loss resistance of said acceptor circuit and constituting the balancing arm of said acceptor circuit, two further ohmic balancing resistances for completing said bridge, diagonal branch circuits of said bridge, an inductive coupling device in one of said branch circuits for coupling said antenna circuit and a further inductive coupling device in the remaining branch circuit for coupling said receiving device.

In testimony whereof I have affixed my signature.

WILHELM SCHEPPMANN.